UNITED STATES PATENT OFFICE.

SIGMOND SAXE, OF NEW YORK, N. Y.

TANNING PROCESS.

14,719. Specification of Reissued Letters Patent. Reissued Aug. 26, 1919.

No Drawing. Original patent a continuation in part of application Serial No. 48,879, filed September 3, 1915. Original No. 1,297,255, dated March 11, 1919, Serial No. 220,287, filed March 4, 1918. Application for reissue filed June 19, 1919. Serial No. 305,440.

*To all whom it may concern:*

Be it known that I, SIGMOND SAXE, a citizen of the United States, residing at New York, in the county of New York and State of New York, have invented certain new and useful Improvements in Tanning Processes; and I do hereby declare the following to be a full, clear, and exact description of the invention, such as will enable others skilled in the art to which it appertains to make and use the same.

This invention relates to tanning processes; and it relates more particularly to a process of making relatively heavy leather, such as sole leather and the like, in which hide is first struck through with relatively weak vegetable tan liquor, and is then filled or completely tanned by treatment in a revolving drum with a much stronger vegetable tanning liquor comprising an extract of osage orange wood. The drum liquor may consist wholly of said extract or, more desirably, it may comprise a mixture or blend of said extract with one or more other vegetable tanning extracts.

The process of the present invention is concerned more particularly with the tanning of hides for production of heavy leather, as distinguished from the tanning or tawing of skins for light leather. It is not concerned with chrome or other mineral tannages, nor with the production of leather intended to be dyed, properly speaking. The process is especially important for the production of sole leather, and will therefore be explained hereinafter more particularly in that connection.

In making sole leather according to the usual practice heretofore prevailing, the hide is first partially tanned by soaking it in weak vegetable tan liquor, in a vat or pit until the hide is "struck through". The partially tanned hide is then removed from the vat and placed in a revoluble drum with a strong vegetable tanning extract or mixture of extracts, and the drum is revolved until the hide is completely tanned. It is generally recognized that the conditions under which the tanning reactions occur in the drum differ radically from those obtaining in vat or pit tanning.

I have found that a concentrated extract of the wood or bark of the osage orange or "bois d'arc", herein termed broadly osage orange wood extract, is particularly effective for use in the second or drumming stage of heavy leather tanning. Aside from a limited use for fence posts and the like, osage orange wood has heretofore been practically a waste material without commercial application; but the present discovery of the special adaptability of its extract as a source of tanning material for tanning sole leather or other heavy leather in the drum not only renders this formerly practically worthless material highly useful, but it also enables the tanner to produce better leather at less cost. Used alone, osage orange wood extract herein described gives a tough strong leather; and when said extract is blended with other tanning extracts, which is most desirable in practice, it materially improves the leather obtainable by the use of such other extracts, in respect to strength, toughness and color. Examples of other tanning extracts suitable for blending with osage orange wood extracts in practising the present process are chestnut, quebracho, oak, hemlock, mangrove, cutch, etc. The term "extract" is here employed in its technical sense as understood in the trade, that is, as signifying a concentrated liquor or solid preparation rich in tanning values.

An osage orange wood extract suitable for use in carrying out my process may be prepared by leaching the comminuted wood or bark, or both, of the osage orange, best with the aid of heat and superatmospheric pressure, and then carefully concentrating the leachings by evaporation, under reduced pressure. The concentration of the finished extract may be varied as desired, but an extract having a specific gravity of about 51° Twaddell (or say 29°–30° Baumé) is admirably suited for the purpose and serves as a convenient basis for computing proper proportions in blends with other extracts. A fair average sample of an osage orange wood extract of approximately this concentration, analyzed according to the official method of the American Leather Chemists Association, shows the following:

| | |
|---|---|
| Total solids | 55.88% |
| Total soluble solids | 52.19% |
| Insoluble material | 3.69% |
| Non-tannins | 12.13% |
| Tannin | 40.06% |
| Purity (percentage relation of tannin to total solids | 71.65% |

Occasional samples show even higher purity. In treating hide in the drum, high purity extracts give best results. Accordingly the high degree of purity characterizing concentrated osage orange wood extract is one reason why my process has proved eminently satisfactory in practice. For purposes of comparison it may be noted that other vegetable tanning extracts in common use are substantially lower in purity, that of chestnut, for example, averaging about 67, and that of hemlock about 62, for comparable concentrations. It will be seen, therefore, that by blending osage orange wood extract with one or more of these other extracts, the purity of the blend is higher than that of such other extract or extracts and that the blend is therefore better suited for use in the drum. The proportion of osage orange wood extract to be blended with another tanning extract or extracts, as the case may be, may vary considerably in practice, and depends in any given instance upon such factors as the purity of the other extract, the effect upon the color of the resultant leather, etc. Osage orange wood extract has high tinctorial power as well as high tanning value. In tanning sole leather, for example, where radical color effects are ordinarily undesirable, an addition to the other extract or extracts of the equivalent of say up to about 10 per cent. by weight of a 50° Twaddell osage orange wood extract is especially effective in giving desirable results, and a 5 per cent. addition is in most cases advantageous in marked degree. Where the osage orange wood extract used has a specific gravity differing from 50° Twaddell, the proportions used in blending are to be altered accordingly.

The successive operations of preliminary tanning or striking through, and the treatment in the drum, are conducted in the present process in much the same manner as heretofore. It is found, however, that not only is the strength and toughness of the resultant leather improved, but that the color is also brightened to such an extent as to render it possible, unless especially light colored leather is desired, to omit the usual acid-alkali bleaching treatment, which ordinarily follows the treatment in the drum. Such omission lessens the cost of the leather by materially shortening the time of manufacture, and saving tanning material drawn out of the leather and wasted by the action of the bleach. Furthermore the deteriorating effect of the bleaching treatment is avoided.

This application is a continuation of my copending application Ser. No. 48,879, filed September 3, 1915.

What I claim is:

1. The process of tanning which comprises treating hide or skin with a tanning liquor comprising an extract of osage orange wood.

2. The process of tanning which comprises treating hide or skin with a tanning liquor comprising a concentrated extract of osage orange wood blended with other tanning material.

3. The process of making relatively heavy leather, such as sole leather and the like, which comprises partially tanning hide in relatively weak vegetable liquor until it is struck through and then filling the partially tanned hide by treatment in the drum with a stronger liquor comprising osage orange wood extract.

4. The process of making relatively heavy leather, such, as sole leather and the like, which comprises partially tanning hide in relatively weak vegetable tan liquor until it is struck through, and then filling the partially tanned hide by treatment in the drum with a stronger liquor comprising a concentrated extract of osage orange wood blended with another vegetable tanning material.

5. The process of making relatively heavy leather, such as sole leather and the like, which comprises partially tanning hide in relatively weak vegetable tan liquor until it is struck through, and then filling the partially tanned hide by treatment in the drum with a stronger liquor comprising a concentrated extract of osage orange wood blended with another vegetable tanning material, the proportion of osage orange wood extract in the blend being equivalent to an addition to such other tanning material of up to about 10 per cent. by weight of an osage orange wood extract having a specific gravity of approximately 50° Twaddell.

6. The process of making relatively heavy leather, such as sole leather and the like, which comprises partially tanning hide in relatively weak vegetable tan liquor until it is struck through, and then filling the partially tanned hide by treatment in the drum with a stronger liquor comprising a concentrated extract of osage orange wood blended with another vegetable tanning material, the proportion of osage orange wood extract in the blend being equivalent to an addition to such other tanning material of about 5 per cent. by weight of an osage orange wood extract having a specific gravity of approximately 50° Twaddell.

In testimony whereof I hereunto affix my signature.

SIGMOND SAXE.

Copies of this patent may be obtained for five cents each, by addressing the "Commissioner of Patents, Washington, D. C."